United States Patent [19]

Seeley et al.

[11] 3,911,349

[45] Oct. 7, 1975

[54] BATTERY CHARGER

[75] Inventors: Ronald G. Seeley, Brick Town; William H. Seeley, Keansburg, both of N.J.

[73] Assignee: ESB Incorporated, Philadelphia, Pa.

[22] Filed: Nov. 7, 1974

[21] Appl. No.: 521,667

[52] U.S. Cl. .................. 320/20; 320/22; 320/39
[51] Int. Cl.² ........................................... H02J 7/04
[58] Field of Search .................... 320/20, 22–24, 320/39, 40

[56] References Cited
UNITED STATES PATENTS

| | | | |
|---|---|---|---|
| 3,660,748 | 5/1972 | Clayton | 320/39 |
| 3,794,905 | 2/1974 | Long | 320/39 X |
| 3,863,129 | 1/1975 | Yamauchi | 320/39 X |

Primary Examiner—L. T. Hix
Assistant Examiner—Robert J. Hickey
Attorney, Agent, or Firm—Anthony J. Rossi, Esq.; Robert H. Robinson, Esq.

[57] ABSTRACT

A battery charging apparatus wherein direct current voltage is applied to the battery to be charged through a controllable switch. The battery charger combines quick charge capability with long battery life. The battery charger charges the battery to a high potential in order to charge the battery quickly to full charge and after full charge is obtained maintains the battery at a low voltage in order to avoid damage and obtain maximum life.

8 Claims, 10 Drawing Figures

DISCHARGED BATTERY (a & b)

CHARGED BATTERY (c & d)

BATTERY CHARGER

BACKGROUND OF THE INVENTION

1. Field of the Invention

This invention relates to battery charging apparatus and, more particularly, to charging apparatus wherein direct current voltage is applied to the battery to be charged through a controllable switch.

2. Description of the Prior Art

Certain prior art battery chargers charge by constant voltage means from a current limited power supply, that is, when a fully discharged battery is placed on charge, it current is limited to C/5 to C/10 rate. During the constant current charging, the potential of the battery slowly rises. When the battery potential rises to a present level, the charger switches to a constant voltage mode. In this mode, the voltage is held constant, which means, in typical situations, the charge current reduces gradually over a period of time toward the end of the charge. The disadvantage of this method is in order to fully charge the battery quickly, the present voltage level of the charger must be set very close to the gassing potential of the battery and in some cases slightly above this potential. This will fully charge the battery in a short period of time, as for example, 10 to 12 hours. However, a battery kept at this potential for a long period of time, for example several months or more, will continually gas and will eventually dry out and fail. If the battery is charged at a preset low voltage above the open circuit voltage of the battery but below the gassing voltage, the battery can be kept on charge for long periods of time without damage. In this mode of operation, however, a low charge voltage will require extensive periods of time to fully charge the battery, as for example, 20 or more hours, and in some cases where extremely long life is desired, which would require a very low charge voltage, the battery can never be fully charged.

The apparatus and charging regime in accordance with the present invention combines quick charge capability with long battery life. As will be explained more fully below, it does this by charging the battery to a high potential in order to charge the battery quickly to full charge and after full charge is attained, maintains the battery at a low voltage in order to avoid damage and obtain maximum life.

SUMMARY OF THE INVENTION

In accordance with the invention, a battery charger is provided of the type including a current supply means for providing direct current, and a controllable switch means for supplying direct current to the battery when the switch is closed for charging the battery and for interrupting the direct current to the battery when the switch is open. Reference signal means are provided for generating a voltage reference. Amplitude sensing means are provided which are operatively connected to the battery for sensing the battery terminal voltage amplitude. A rate sensing means is provided operatively connected to the battery for sensing the time rate of change of battery terminal voltage and for generating an output signal proportional to the time rate of change of the battery terminal voltage. The output signal of the rate sensor is coupled to the reference signal for varying the reference signal in proportion to the time rate of change of the battery terminal voltage. Comparator means are provided operatively connected to the reference signal means and to the amplitude sensing means for comparing the sensed battery voltage amplitude to the varying reference signal. The comparator means has a two state output that is dependent on whether the sensed battery voltage amplitude is greater or lesser than the varying reference signal. Means are provided for sensing the state of the output of the comparator means for closing the switch in one of the states and opening the switch in the other state of the comparator means.

In another embodiment of the invention, the output signal from the rate sensing means is coupled to the amplitude sensing means for varying the sensed battery voltage amplitude in proportion to the time rate of change of the battery terminal voltage.

The above noted and other features of the invention will be more fully understood from the following detailed description when considered with reference to the accompanying drawings.

DESCRIPTION OF THE PREFERRED EMBODIMENTS

Figure 1:
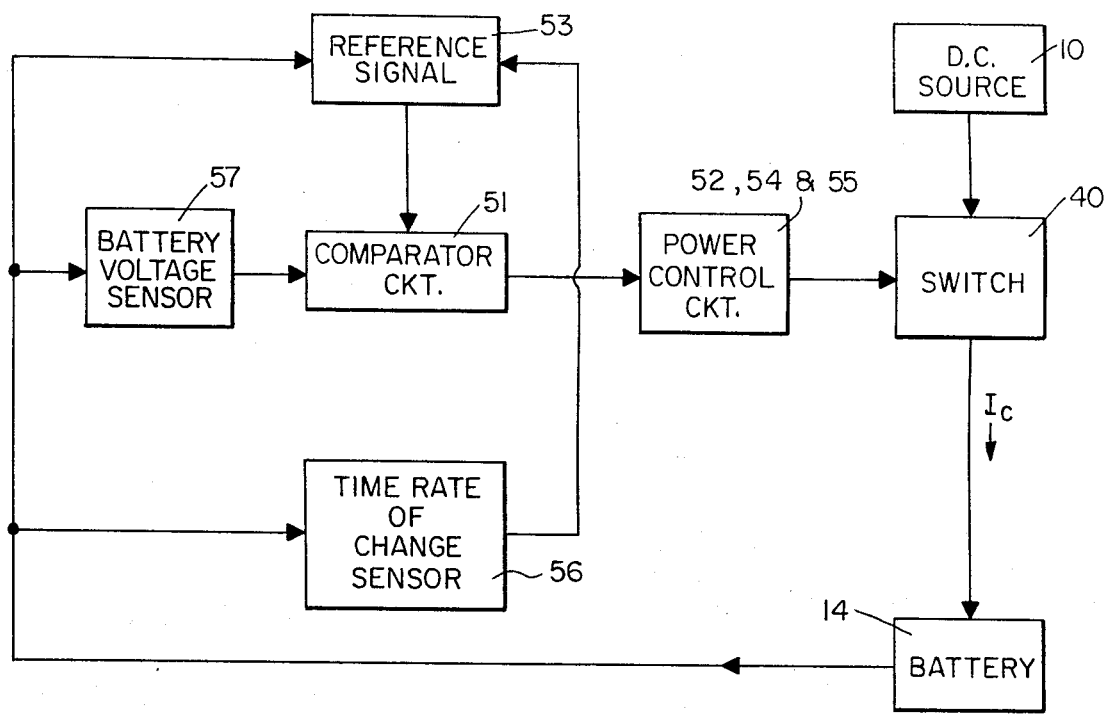
FIG. 1 is a block diagram illustrating the functions of a battery charging circuit according to this invention.

Throughout the following description similar reference characters refer to similar components in all of the figures of the drawing.

Referring now to the drawing, and FIG. 1 in particular, there is shown a block diagram of a battery charger which is an embodiment of the invention. The blocks illustrate the functions of the circuit comprising the battery charger and the arrows indicate, generally, direction of power or signal flow.

Block 10 represents a source of DC power which has an output leading to a switching circuit represented by block 40. The switching circuit 40 is of the controllable type, as for example an SCR. When the switch 40 is activated or closed, DC power is provided to the battery 14. The battery 14 is connected to a block 53 representing a Reference Signal, a Battery Voltage Sensor 57 and a Time Rate of Change Sensor 56. A Comparator Circuit 51 is illustrated in FIG. 1 having inputs from the Battery Voltage Sensor 57 and the Reference Signal block 53. The output of the Comparator Circuit 51 is connected to a block labeled 52, 54 and 55 which represents a Power Control Circuit. The output of the Power Control Circuit is in turn connected to the Switch 40.

Figure 3:
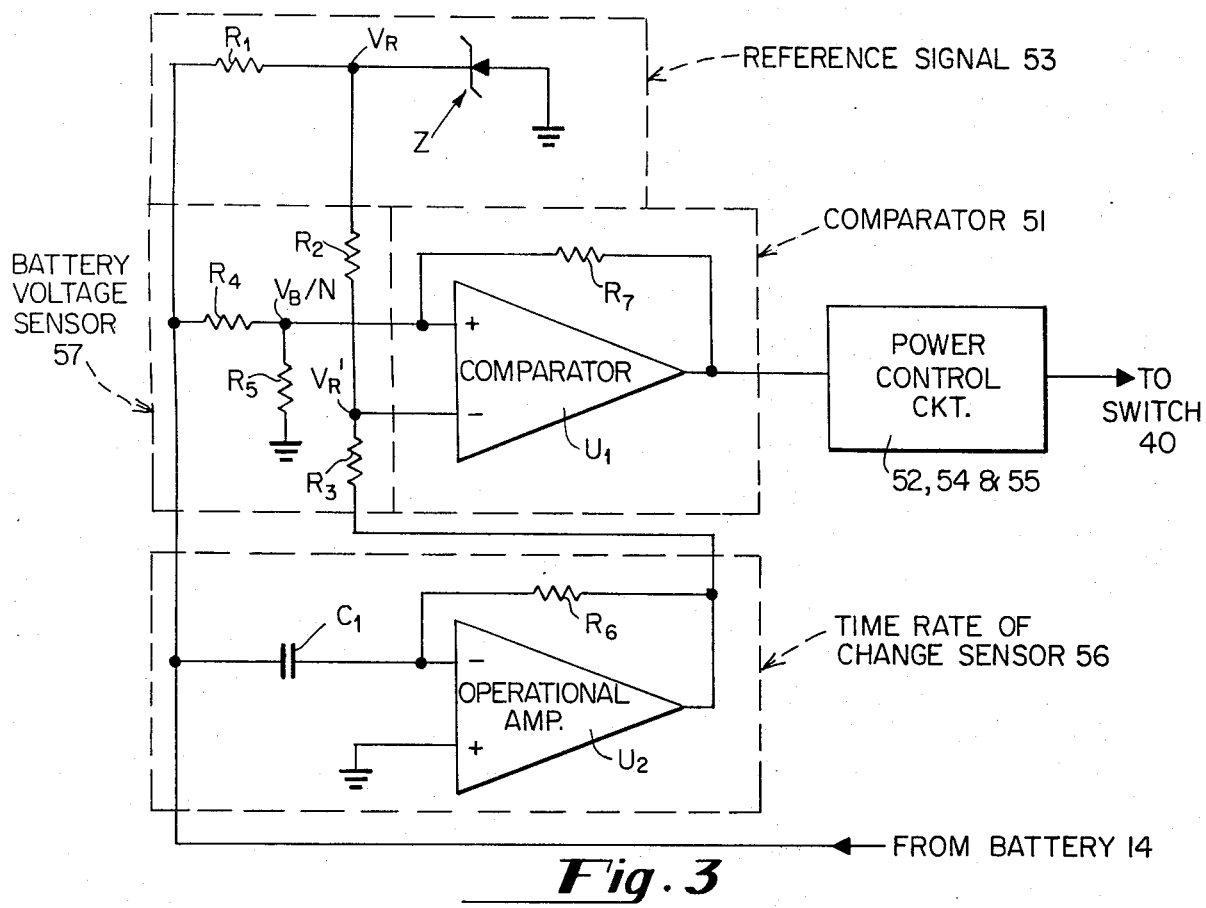
FIG. 3 is a generalized schematic circuit and partial block diagram of the battery charging circuit illustrated in FIG. 1.

Referring now to FIG. 3, there is shown in FIG. 3 a generalized schematic circuit and partial block diagram of the battery charging circuit illustrated in FIG. 1. Operation of the battery charging circuit of FIGS. 1 and 3 as well as a description of the components from which the functional blocks of FIG. 1 are made up will now be set forth with specific reference to FIG. 3.

Assuming the amplitude of the battery voltage is static, that is, there is no load connected to the battery and no charging current is being supplied to the battery, the output of the Time Rate of Change Sensor 56 comprised of operational amplifier $U_2$, resistor $R_6$ and Capacitor $C_1$ will be zero. The Comparator 51 comprised of comparator $U_2$ and resistor $R_7$ compares a fraction of the battery voltage ($V_B/N$) derived at the junction of resistors $R_4$ and $R_5$ to an effective reference voltage ($V_R'$) derived at the junction of resistors $R_2$ and $R_3$. The effective reference voltage ($V_R'$) is a fraction of the Reference Signal 53 ($V_R$) which is derived at the junction of resistor $R_1$ and Zener diode z. If $V_B/N$ is less than $V_R'$ the output of the comparator $U_1$ will be low. The Power Control Circuit (52, 53 and 54) will interpret this as requirement to charge the battery 14 and will close the switch 40 permitting charge current $I_C$ to flow. If $V_B/N$, however, is greater than $V_R'$, the output of comparator $U_1$, will be high, and the Power Control Circuit will open the switch 40. The resistor $R_7$ provides circuit hysteresis so that comparator $U_1$, switches at a slightly different $V_B/N$ in each direction.

It will be recognized to those skilled in the art that it is possible for the fraction of the battery voltage ($V_B/N$) and the effective reference voltage ($V_R'$) to be interchanged at the comparator $U_1$ input terminals. The sense of the comparator output will then be reversed, and the Power Control Circuit (52, 54 and 55) will interpret a high comparator output level as a requirement to charge the battery, and will close the switch 40. Conversely, the Power Control Circuit will interpret a low comparator output level as a requirement to stop charging and will open the switch.

Figure 5:
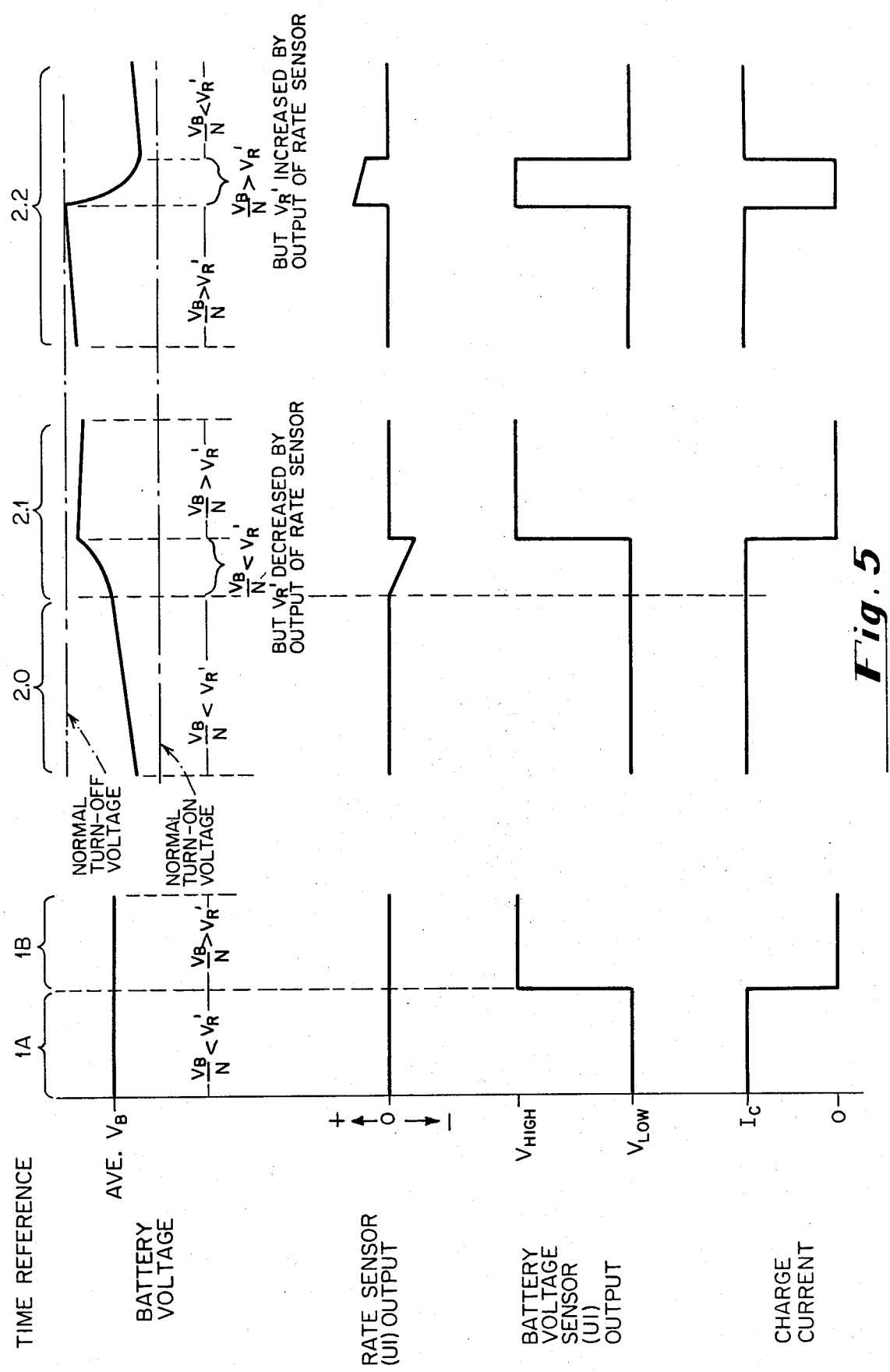
FIG. 5 is a graph illustrating waveforms useful to explain the battery charging circuits of FIGS. 1–4.

The action just described is illustrated in FIG. 5 in the sections thereof labeled 1A and 1B.

Now assume that the battery is being charged, and the rate of rise (dv/dt) of the battery voltage is very small implying a discharged or nearly discharged battery. The output of operational amplifier $U_2$ will be close to zero because the output thereof is directly proportional to the rate of change of battery voltage. That is, capacitor $C_1$ will be charged to the battery voltage, and little or no current flows into the input of operational amplifier $U_2$ or in the feedback resistor $R_6$. The effective reference voltage $V_R'$ will therefore be essentially unchanged and comparator $U_1$ will compare $V_B/N$ to $V_R'$ as in the first case above. Charging will continue until $V_B/N$ rises above $V_R'$ when the output of comparator $U_1$ will go high and the Power Control Circuit (52, 54 and 55) will open the switch 40. The hysteresis provided by $R_7$ will raise the input voltage of comparator $U_1$ slightly so that $V_B/N$ must go slightly lower than the original switching voltage in order to close the switch 40 again. The action just described in this paragraph is illustrated graphically in the section labeled 2.0 in FIG. 5.

Now assume that charging has continued until the battery is nearly fully charged. In this state, the application of charging current will cause the battery voltage to rise rapidly. The output of operational amplifier $U_2$, since it is proportional to the rate of change of battery voltage, will now be at some negative voltage. This negative voltage, applied to comparator $U_1$ through resistor $R_3$ will decrease $V_R'$. A decrease in $V_R'$ will cause the output of comparator $U_1$ to switch high at a lower $V_B/N$ than in the example given in the paragraph next above. Thus, the switch 40 is opened at a lower battery voltage when the battery is near full charge than when it is nearly discharged reducing the average charging voltage. This allows rapid charging at a high voltage for discharged batteries but reduces the applied voltage for charged batteries and thereby reduces loss of electrolyte and grid corrosion due to gassing. The action just described in this paragraph is illustrated graphically in the section labeled 2.1 in FIG. 5.

Now assume again the case of a nearly discharged battery. When charging current is applied to a discharged battery, the rate of rise of battery voltage is low as described above. When the charging current is removed, however, the rate of decay (fall) of battery voltage is greater than it is for a charged battery. The rate of decay (- dv/dt) will be sensed by the Time Rate of Change Sensor 56, and the output of operational amplifier $U_2$ will now be at some positive voltage. This voltage, applied to comparator $U_1$ input through resistor $R_3$, will increase $V_R'$. An increase in $V_R'$ will cause the output of comparator $U_1$ to switch low at a higher $V_B/N$ than for fully charged batteries. Thus the switch 40 will close and charge the battery at a higher average voltage for discharged batteries than for charged batteries. This insures more rapid charging for discharged batteries as described in the paragraph next above. The action just described is illustrated graphically in the section labeled 2.2 in FIG. 5.

Figure 4:
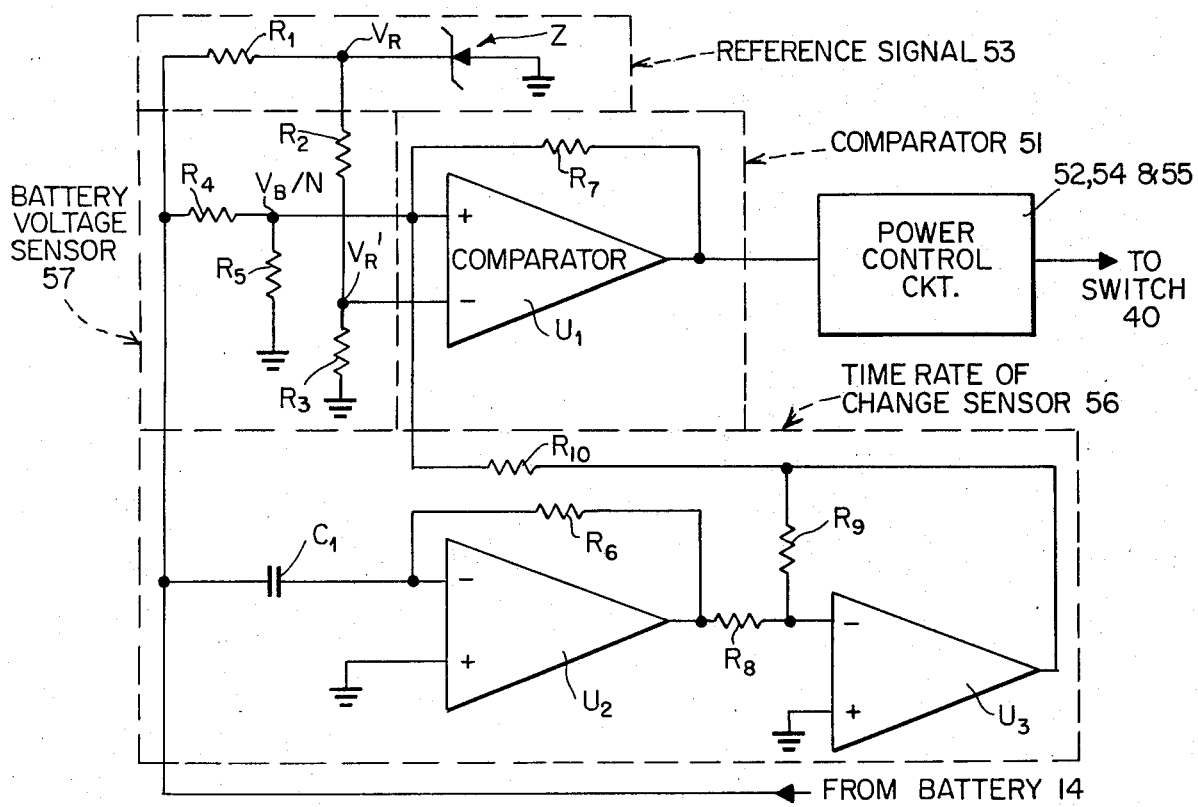
FIG. 4 is a generalized schematic circuit and partial block diagram of the battery charging circuit illustrated in FIG. 1 but with a modification thereto.

It should be pointed out here that FIG. 3 shows the output of the Time Rate of Change Sensor 56, more specifically, the output of operational amplifier $U_2$ applied to the negative input of the comparator $U_1$, where it acts to increase or decrease $V_R'$. The output of the operational amplifier $U_2$ can as easily be inverted and applied to the positive input of comparator $U_1$ where it will act to decrease or increase the battery voltage signal $V_B/N$. Such an arrangement is shown in FIG. 4. In comparing FIGS. 3 and 4, it will be noted that they differ from one another only by the inclusion of amplifier $U_3$, resistors $R_8$, $R_9$ and $R_{10}$. It will be understood by those skilled in the art that the action of these latter components merely inverts the output of the operational amplifier $U_2$. The charging action of the circuit of FIG. 4 will be identical to that described with reference to FIG. 3. Also, it should be pointed out that as with the Comparator $U_1$ shown in FIG. 3, the input terminals of the comparator $U_1$ of FIG. 4 can be interchanged. This will change the sense of the comparator $U_1$ output and the sense of the Power Control Circuit, charging at a high comparator $U_1$ output level and not charging at a low comparator $U_1$ output level.

Figure 2:
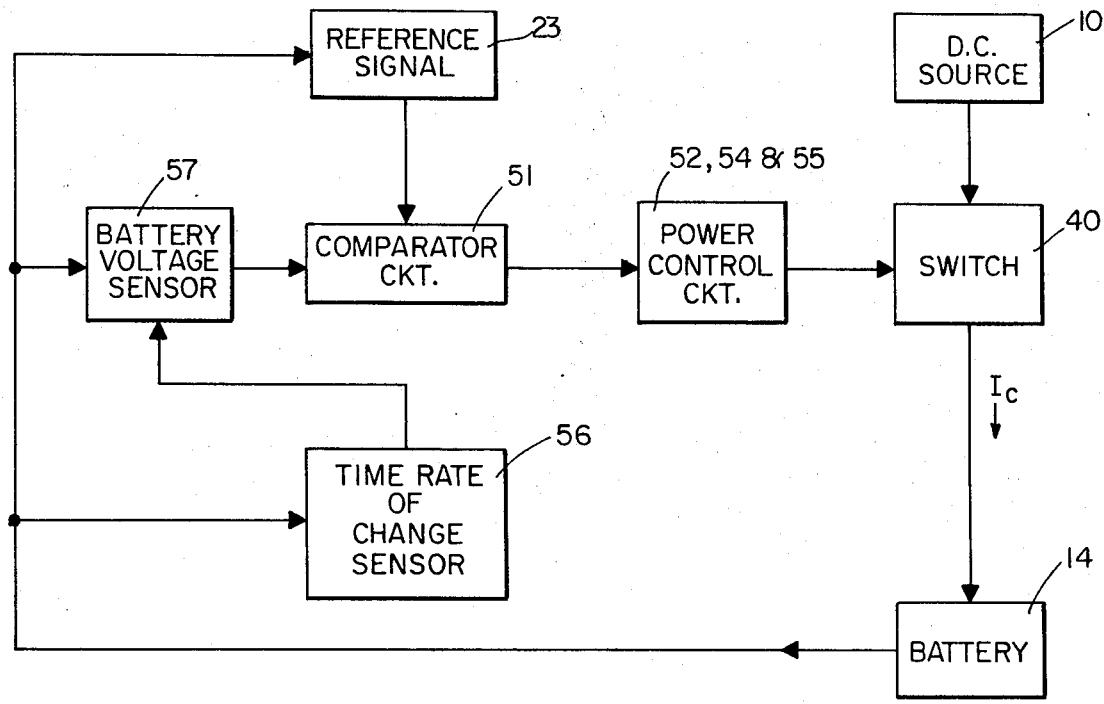
FIG. 2 is a block diagram illustrating the functions of a second embodiment of a battery charging circuit according to this invention.

Referring now to FIG. 2, there is shown a block diagram illustrating the functions of a second embodiment of a battery charging circuit in accordance with the invention. In comparing the block diagram of FIG. 1 with the block diagram of FIG. 2 it will be noted that they differ in the fact that in FIG. 1 the output of the Time Rate of Change Sensor 56 is connected to the Reference Signal block 53, whereas in FIG. 2 the output of the Time Rate of Change Sensor 56 is connected to the Battery Voltage Sensor block 57. Accordingly, the difference in the operation of the circuits of FIGS. 1 and 2 is that in FIG. 1 the Time Rate of Change Sensor 56 varies the reference signal in proportion to the time of change of the battery terminal voltage whereas in FIG. 2 the Time Rate of Change Sensor 56 varies the sensed battery voltage amplitude in proportion to the time rate of change of the battery terminal voltage. Other than for this fact, operation of the circuit of FIG. 2 is essentially the same as the operation of the circuit of FIG. 1. Schematic circuits comparable to FIGS. 3 and 4 which can be characterized as implementations of the circuit of FIG. 1 have not been illustrated for the block diagram of FIG. 2. It will be evident, however, to those skilled in the art, the manner in which implementation of the circuit of the block diagram of FIG. 2 may be had.

Figure 6:
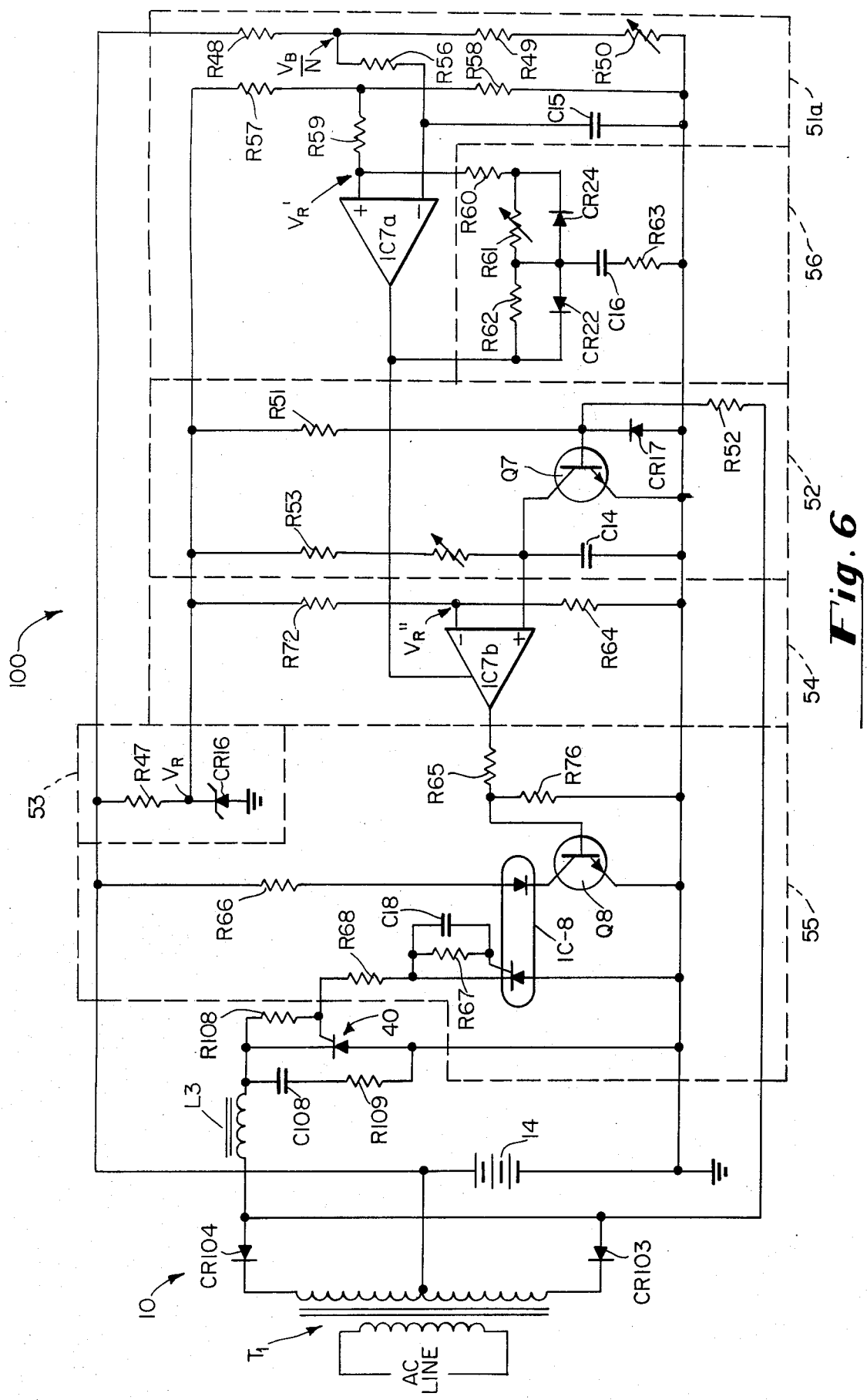
FIG. 6 is a schematic circuit of an actual battery charger constructed in accordance with the teachings of the present invention.

Referring now to FIG. 6, an actual battery charger constructed in accordance with the teachings of the present invention is illustrated generally at 100. The circuit in FIG. 6 will first be described with reference to the functions of the blocked out portions thereof and this will be followed by a more detailed description of both the circuit components and the operation of the battery charger 100. The storage battery 14 to be charged is charged by energy from the normal AC line through main transformer $T_1$. The diodes CR103 and CR104 provide full-wave rectified DC voltage to the battery charger 100. The full-wave rectified DC voltage is applied to the battery 14 through a phase-controlled silicon controlled rectifier (SCR) 40. The Battery Voltage Sensor 57 of FIGS. 1 and 2 is shown for ease of illustration in FIG. 6 as combined with the Comparator Circuit 51 of FIGS. 1 and 2 and appears within block 51a in FIG. 6. The Battery Voltage Sensor 51a determines battery state of charge. If charging is required, Battery Voltage Sensor 51a supplies operating voltage to a Phase Control 54 (to be described below). A Ramp Generator and Reset circuit 52 (to be described below) applied a voltage ramp to the Phase Control 54. When the ramp voltage exceeds a reference voltage $V_R'$, which is supplied by the reference voltage source or Reference Signal 53, the Phase Control 54 output switches and turns on an Optical Coupler 55 (to be described below). The Optical Coupler 55 in turn causes the SCR 40 to turn on, applying a charging current pulse to the battery 14. The inductor L3 provides reactive charging current limiting. When the AC line voltage passes through zero, the SCR 40 turns off and the above sequence is repeated. When the battery 14 is fully charged, the Battery Voltage Sensor 51a will cause charging to cease.

A detailed description of each of the major blocks or components of FIG. 6 will not be given.

BATTERY VOLTAGE SENSOR 51a

The Battery Voltage Sensor 51a operates as a voltage comparator, with inputs from the battery 14 and the reference voltage source $V_R$ or Reference Signal 53 comprised of resistor R47 and diode CR16. When the sensed battery voltage $V_B/N$ is below the effective reference voltage $V_R'$, charging is required, and the output of the comparator 1C7A switches to a high state. Positive feedback through the Time Rate of Change Sensor 53 (to be described below) provides a small amount of hysteresis so that the comparator 1C7A switches at a slightly different $V_B/N$ in each direction. Component 1C7A is a commonly available operational amplifier, connected as a voltage comparator. The input impedances of comparator 1C7A comprise T networks that set the input bias levels and select the appropriate fractions of the battery and reference voltages for comparison. The T networks comprise the resistors R57, R58, R59 and R48, R49, R50 and R56. The variable resistor R50, in the battery input network, is a means for accurate adjustment of the battery voltage at the comparator 1C7A switching point. Capacitor C15 is a filter that reduces the effect of power line noise (120 Hz) on circuit operation.

TIME RATE OF CHANGE SENSOR 56

The Time Rate of Change Sensor 56 (actually the feedback network of comparator 1C7A) comprises the resistors R60, R61, R62 and R63, capacitor C16 and diodes CR22 and CR24. The action of the Sensor 56 depends on the charging characteristics of lead-acid batteries. First, when charging current is applied to a discharged battery, the battery terminal voltage will be relatively low, and will rise slowly. Second, if charging current is applied to a charged or nearly charged battery, the terminal voltage will rise more quickly. The sensor 56 enables the Battery Voltage Sensor 51 to respond to the rate of rise of the battery terminal voltage during application of charging current, and adjust the charging regime to be now described.

Assume that the battery has been discharged by an emergency power demand, and that the AC line has been re-established. The battery, now unloaded, will rise toward its nominal terminal voltage (e.g. 24 volts). The reference voltage, being higher than the battery voltage, will cause comparator 1C7A output to be high, enabling the charger to begin charging the battery. Capacitor C16 will be charged to a value determined by the voltage divider consisting of resistors R58 through R62. When the battery terminal voltage rises to the reference voltage, comparator 1C7A will switch to the low state, turning off the charger. Under this condition, the battery terminal voltage will decrease, but will decrease more slowly as full charge is reached. Capacitor C16 will discharge into comparator 1C7A output through diode Cr22, at a rate determined by resistor R63. The forward voltage drop of diode CR22 decreases the positive feedback applied to comparator 1C7A input. If then the battery voltage decays quickly, as it would in a discharged condition, comparator 1C7A output will quickly switch high again, causing charging to restart. Capacitor C16 will not have discharged much, so that diode CR24 will be forward biased, and the same positive feedback voltage will be applied to comparator 1C7A input as before. Capacitor C16 will recharge through resistors R62 and R63.

When the battery reaches nearly full charge, and comparator 1C7A output switches low, turning off the charger, the battery terminal voltage will decay slowly. Capacitor C16 will be allowed to discharge completely into comparator 1C7A output. Now when the battery terminal voltage decays below the reference voltage, comparator 1C7A output will switch high and restart the charger. Capacitor C16, being discharged, appears initially as a short circuit, and a new feedback network is formed, comprised of the T network resistors R60 – R61, R62 and R63. Less positive feedback is applied to comparator 1C7A input while capacitor C16 is charging, and the sensed battery voltage $V_B/N$ does not have to rise as high as it did previously to turn off the charger. The faster the sensed battery voltage $V_B/N$, the lower the average voltage applied to the battery will be. Thus, the circuit is responsive to the rate of rise of $V_B$ for fully charged batteries.

The following slow decay of battery voltage will again allow capacitor C16 to discharge completely, with the result that maximum positive feedback is applied to comparator 1C7A input, and the turn-on point for comparator 1C7A is reduced. This has the effect of reducing the average charging voltage of a fully-charged battery to that just necessary to maintain full charge.

Figure 7:
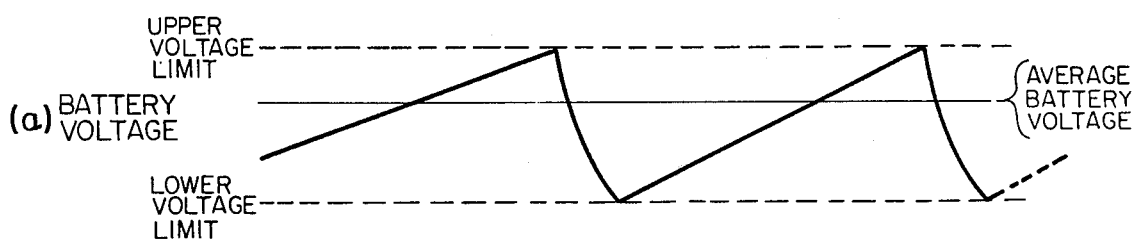
FIGS. 7a–7d are graphs illustrating waveforms useful to explain the battery charging circuit of FIG. 6.
Figure 7:
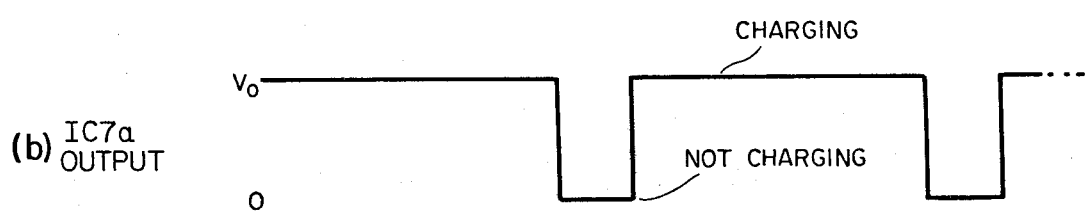
Figure 7:
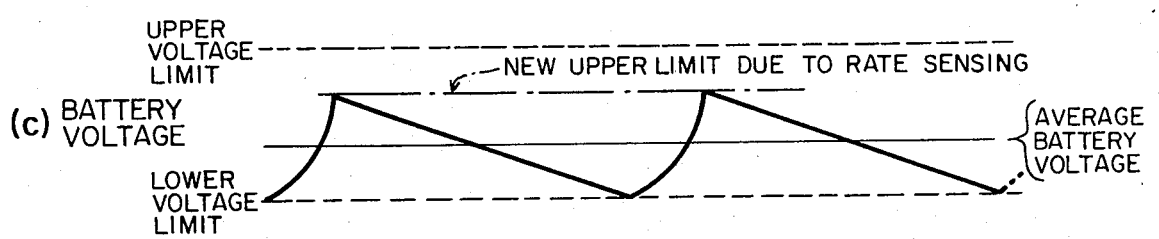
Figure 7:
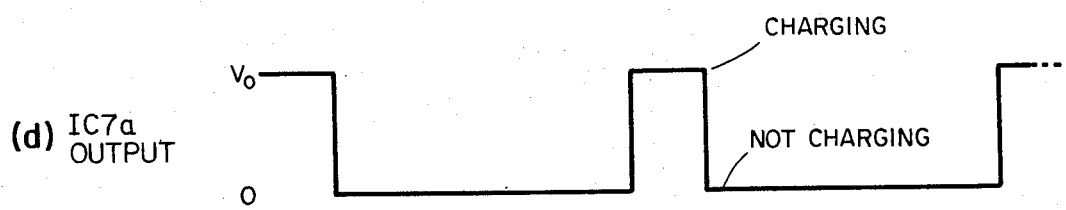

Thus, the hysteresis provided by the Rate of Change Sensor 56 is adjusted according to the state of charge of the battery. This action is summarized in FIGS. 7a–7d. The charging and open-circuit voltage characteristics of a battery are shown for two charge states in FIGS. 7a and 7c. In FIG. 7b and FIG. 7d, the output states of comparator 1C7A are shown; charging takes place when comparator 1C7A output is high. The charging regime is such that a predetermined voltage range is permitted at the battery terminals. Without capacitor C16, the range would have its widest limits at all states of charge, i.e., the charger would start at a low value of open circuit terminal voltage and remain on to a high value of charging terminal voltage. Capacitor C16, however, acts to reduce the hysteresis effect of positive feedback for fully charged batteries according to the rate of change of terminal voltage. In FIGS. 7a and 7c, the actual voltage trip points of comparator 1C7A is indicated for two states of charge, i.e., discharged and fully charged batteries.

The advantage of this charging method is that a discharged battery can be charged at a high average terminal voltage, permitting faster charge, while a fully charged battery can be maintained at an average charging voltage safely below gassing voltages. Thus, battery maintenance is reduced and reliability is increased.

RAMP GENERATOR AND RESET CIRCUIT 52

The Ramp Generator and Reset Circuit 52 produces a voltage ramp (positive sawtooth) synchronized with the AC line voltage. The ramp voltage is applied to the Phase Control comparator (1C7B) for phase control of the charger SCR 40.

Charging voltage for capacitor C14 is provided through R53 and R54. Capacitor C14 charges exponentially, and the capacitor C14 voltage is applied to the Phase Control comparator (1C7B). Capacitor C14 is discharged each half-cycle of the AC line by transistor Q7. Base drive for transistor Q7 comes from the power supply through resistor R51. When the Ac line voltage is not zero, the transformer $T_1$ applies a negative voltage through resistor R52 to the transistor Q7 base, turning off transistor Q7 and allowing capacitor C14 to charge. When the AC line voltage passes through zero, transistor Q7 is biased on through resistor R51, and capacitor C14 is discharged. The ramp voltage is thus synchronized with the Ac line. Diode CR17 protects transistor Q7 from excessive reverse base-emitter voltage.

Phase Control Circuit 54

The Phase Control 54 comprises amplifier 1C7B, connected as a differential comparator, and the voltage divider comprising resistors R72 and R64. The ramp voltage from Ramp Generator 52 is applied to the non-inverting input of comparator 1C7B. The reference voltage 53 is applied to the inverting input of comparator 1C7B through the divider resistors R72 and R64.

Comparator 1C7B has, in effect, a third input at the voltage supply terminal. The voltage supply is provided by comparator 1C7A in the Battery Voltage Sensor 51. The Phase Control comparator (1C7B) triggers the charger SCR 40 only when the Battery Voltage Sensor 51 output is high. When the Phase Control comparator (1C7B) is thus enabled, the ramp voltage applied to the non-inverting input of the comparator (1C7B) will rise until it exceeds the voltage at the inverting input of the comparator (1C7B) and the Phase Control comparator (1C7B) output will switch positive, turning on the SCR 40 through the Optical-Coupler circuit 55.

OPTICAL-COUPLER 55

An Optical-Coupler 55 (electro-optical isolator) is used to transfer the gate trigger signal from the Phase Control comparator (1C7B) to SCR 40.

The coupler consists of a LED (light-emitting diode) and a light-sensitive SCR in the same package, labeled IC-8 in FIG. 6. When the LED is energized by forward current, the SCR in IC-8 is gated on. Current flows from ground through the SCR in IC-8 and into SCR 40 gate circuit. Resistor R67 and capacitor C18 prevent the coupler SCR from firing due to noise. Resistors R68 and R108 limit the SCR 40 gate current and provide noise immunity, respectively.

The LED current is limited by resistor R66. When charging is required, and the ramp voltage (from Ramp Generator 52) triggers the Phase Control comparator (1C7B), transistor Q8 is turned on by base current through the resistor network comprised of resistors R65 and R76. The LED remains on until the ramp voltage is reset by transistor Q7 in the Ramp Generator and Reset Circuit 52.

Although the preferred embodiments of the invention have been described with some particularity, many modifications and variations are possible in the preferred embodiments without deviating from the invention. Accordingly, it is to be understood, that within the scope of the appended claims, the invention may be practiced otherwise than as specifically described.

What is claimed is:

1. In a battery charger, including:
   1. current supply means for providing direct current, and;
   2. controllable switch means for supplying direct current to the battery when the switch is closed for charging the battery and for interrupting the direct current to the battery when the switch is open, the improvement comprising:
      a. reference signal means for providing a reference signal;
      b. amplitude sensing means operatively connected to the battery for sensing the battery terminal voltage amplitude;
      c. rate sensing means operatively connected to the battery for sensing the time rate of change of battery terminal voltage and for generating an output signal proportional to the time rate of change of the battery terminal voltage, said output signal being coupled to the reference signal and varying the reference signal in proportion to the time rate of change of the battery terminal voltage;
      d. comparator means operatively connected to reference signal means and to the amplitude sensing means for comparing the sensed battery voltage amplitude to the varying reference signal, the comparator means having a two-state output that is dependent on whether the sensed battery voltage amplitude is greater or lesser than the varying reference signal; and e. means for sensing the state of the output of the comparator means for closing said switch means in one of the states and opening said switch means in the other state of the comparator means.

2. In a battery charger as defined in claim 1 wherein said reference signal means includes a divider for deriving a fraction of the reference signal, said output signal of the rate sensing means being coupled to said fraction of the rate sensing means for varying said fraction of the reference signal in proportion to the time rate of change of the battery voltage, and wherein the comparator means compares the sensed battery voltage amplitude to the varying fraction of the reference signal.

3. A battery charger as defined in claim 2 wherein said means for sensing the state of the output of the comparator means includes a control circuit operatively connected to said switch, said control circuit including an optical-coupler operatively connected to said comparator means and to said switch means.

4. A battery charger as defined in claim 3 wherein said control circuit further includes a ramp generator means operatively connected to said optical-coupler.

5. In a battery charger including:
1. current supply means for providing direct current; and,
2. controllable switch means for supplying direct current to the battery when the switch is closed for charging the battery and for interrupting the direct current to the battery when the switch is open, the improvement comprising;
   a. reference signal means for providing a reference signal;
   b. amplitude sensing means for sensing the battery terminal voltage amplitude;
   c. rate sensing means operatively connected to the battery for sensing the time rate of change of battery terminal voltage and for generating an output signal proportional to the time rate of change of the battery terminal voltage, said output signal being coupled to the amplitude sensing means and varying the sensed battery voltage amplitude in proportion to the time rate of change of the battery terminal voltage;
   d. comparator means operatively connected to the reference signal means and to the amplitude sensing means for comparing the varying sensed battery voltage amplitude to the reference signal, the comparator means having a two state output that is dependent on whether the sensed battery voltage amplitude is greater or lesser than the reference signal; and
   e. means for sensing the state of the output of the comparator means for closing said switch means in one of the states and opening said switch means in the other state of the comparator means.

6. A battery charger as defined in claim 5 wherein said amplitude sensing means includes a divider for deriving a fraction of the battery terminal voltage amplitude, said output signal of the rate sensing means being coupled to said fraction of the battery terminal voltage amplitude for varying said fraction of the battery terminal voltage amplitude in proportion to the time rate of change of the battery voltage, and wherein the comparator means compares the reference signal to the fraction of the battery terminal voltage amplitude.

7. A battery charger as defined in claim 6 wherein said means for sensing the state of the output of the comparator means includes a control circuit operatively connected to said switch, said control circuit including an optical-coupler operatively connected to said comparator means and to said switch.

8. A battery charger as defined in claim 7 wherein said control circuit further includes a ramp generator means operatively connected to said optical-coupler.

* * * * *